(No Model.)
E. T. GENNERT.
PROCESS OF EXTRACTING OIL FROM OLEAGINOUS SEEDS.
No. 393,972. Patented Dec. 4, 1888.
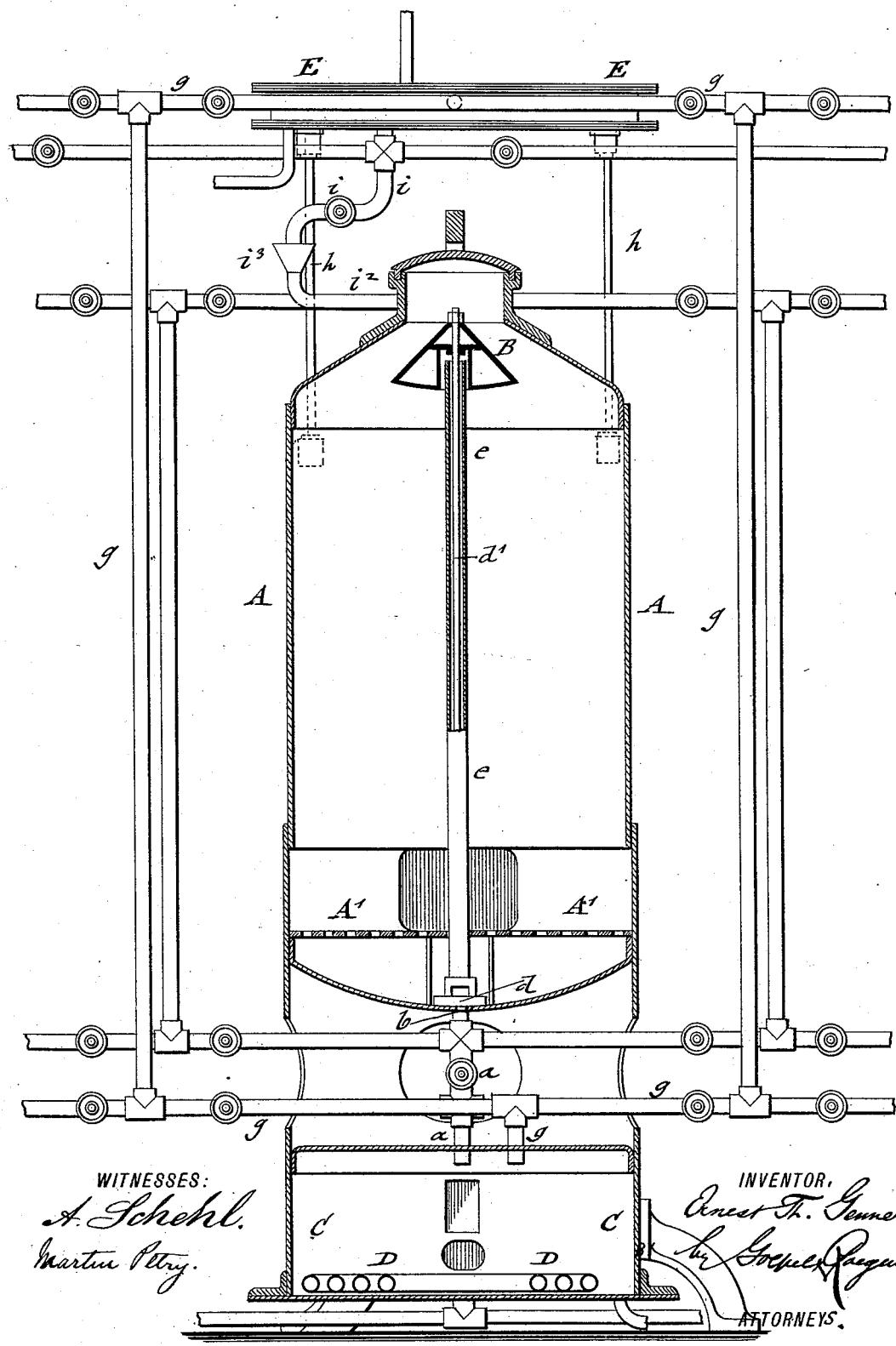
WITNESSES:
A. Schehl.
Martin Petry.
INVENTOR,
Ernest T. Gennert.
Goepel Raegener
ATTORNEYS.

United States Patent Office.

ERNEST TH. GENNERT, OF NEW YORK, N. Y.

PROCESS OF EXTRACTING OIL FROM OLEAGINOUS SEEDS.

SPECIFICATION forming part of Letters Patent No. 393,972, dated December 4, 1888.

Application filed October 14, 1887. Serial No. 252,345. (No specimens.)

*To all whom it may concern:*

Be it known that I, ERNEST TH. GENNERT, of the city, county, and State of New York, have invented certain new and useful Improvements in Process of Extracting Oil from Oleaginous Seeds, of which the following is a specification.

This invention relates to an improved process of extracting oil from cotton and other oleaginous seed by diffusion, as contradistinguished from extracting it by maceration, boiling, or pressure, whereby a greater yield of oil is obtained and a meal of superior quality produced; and the invention consists in a process of extracting oil from cotton and other oleaginous seeds by crushing the seeds, subjecting the crushed seeds to a temperature of from 212° to 220° Fahrenheit, next subjecting the seeds at ordinary temperature to the fractional diffusion by a suitable volatile solvent, and, lastly, separating the solvent from the oil by distillation.

The accompanying drawing represents a vertical central section of one form of apparatus by which my improved process of extracting oil from cotton and other oleaginous seed may be carried out.

When the oil of cotton-seed is to be extracted, the same has to be first prepared, as it is covered with a short lint or wool-like covering which has to be removed before the seed is ready for further treatment. This is accomplished by passing the same through a suitable abrading-mill in which it is exposed to the abrading action of roughened surfaces. The seed is then passed through a crushing-mill of any approved construction, by which it is crushed or cracked, care being taken that it is not ground into a meal. The crushed or cracked seed is next subjected to heat at a temperature of from 212° to 225° Fahrenheit, it being exposed to this heat for about ten minutes, so as to coagulate the vegetable albumen and change the condition of the walls (*parenchyma*) of the cells, so that the volatile solvent can diffuse through said walls and extract the oil in the cells, on the principle of diffusion. The so-prepared seed is next allowed to cool, and then subjected at ordinary temperature to the action of a suitable solvent—such as benzine—in a cylindrical diffuser, A, shown in the drawing. The seeds are placed into the diffuser A through a manhole at the top part of the same, said diffuser being provided with a false perforated bottom, A', and an opening, b, in the bottom, which is closed by a valve, d, the stem, d', of which passes through a hollow central tube, e, of the diffuser A, and is provided at the upper end with a conical float, B, which lifts and opens the valve when the diffuser A is nearly filled with benzine, so as to discharge the extracted oil, which, having greater specific gravity than the benzine, is collected at the bottom of the diffuser A and conducted through a connecting-pipe, a, into a receiver, C, located below the diffuser A. The benzine is gradually supplied to the interior of the diffuser A and permeates slowly through the body of the prepared seed in the same, extracting by diffusion the oil contained in the unbroken cells, as the cells absorb considerable benzine in place of the oil set free or diffused. When the diffuser A is nearly filled with seed and benzine, so that the level of benzine reaches the float, the latter is lifted and thereby the valve opened, so that the oil is dropped through the connecting-pipe into the receiver below. The float then sinks again and closes the valve, the alternating lifting and lowering of the float producing the opening and closing of the valve, which is continued as long as the flow of benzine to the diffuser takes place. When the receiver C has been filled up to a certain level, steam is admitted to a coil, D, located at the bottom of the receiver C, the heat of which vaporizes the benzine and forces the same through a connecting-pipe, g, to a condenser, E, supported above the diffuser A by suitable rods, h, the vapors being passed in the opposite direction to the flow of the cooling-water, on the counter-current principle, through a coil in said condenser, so as to condense the vapors into liquid form. The condensed liquid is then returned by its own gravity through a return-pipe, i, provided with a stop-cock, i', and a supply-pipe, $i^2$, provided with a funnel, $i^3$, to the upper part of the diffuser A, as shown in the drawing. The condensed benzine is thus resupplied free of oil to the seed in the diffuser A, so that the process of extraction by diffusion is kept up as long as new quantities of benzine are returned to the diffuser, until nearly all the oil in the seed is extracted. The charge of seed and benzine is then removed from the diffuser and a new charge placed into the same and exposed to the diffusing action of the benzine and the separation of the same from the oil by distillation. This process of extraction by diffusion is accelerated by arranging a number of diffusers, receivers, and condensers in battery, whereby the oil is more quickly extracted from the seed on the principle of fractional diffusion, so that larger quantities of seed can be handled in a shorter time than by using the same number of apparatus singly.

Having thus described my invention, I claim as new and desire to secure by Letters Patent—

The process herein described of extracting oil from cotton and other oleaginous seeds, which consists of the following steps: first, subjecting the crushed seed to a temperature of from 212° to 225° Fahrenheit; secondly, subjecting the seed at ordinary temperature to the diffusing action of benzine or other volatile solvent; thirdly, separating the heavier liquid, composed of a solution of the oil and solvent, by gravity from the remaining quantity of solvent, and, lastly, separating the solvent from the oil by distillation, substantially as set forth.

In testimony that I claim the foregoing as my invention I have signed my name in presence of two subscribing witnesses.

ERNEST TH. GENNERT.

Witnesses:
PAUL GOEPEL,
MARTIN PETRY.